Figure 5:
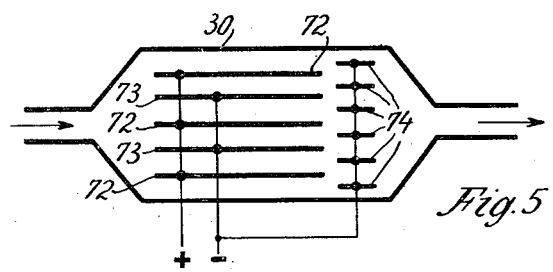

July 7, 1936.  G. A. KRAUSE  2,046,467
STERILIZATION OF LIQUIDS BY MEANS OF OLIGODYNAMY
Filed Jan. 20, 1932  2 Sheets—Sheet 1
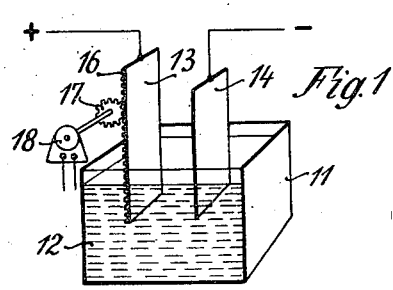
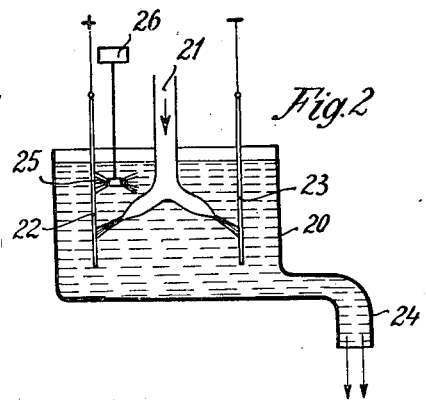
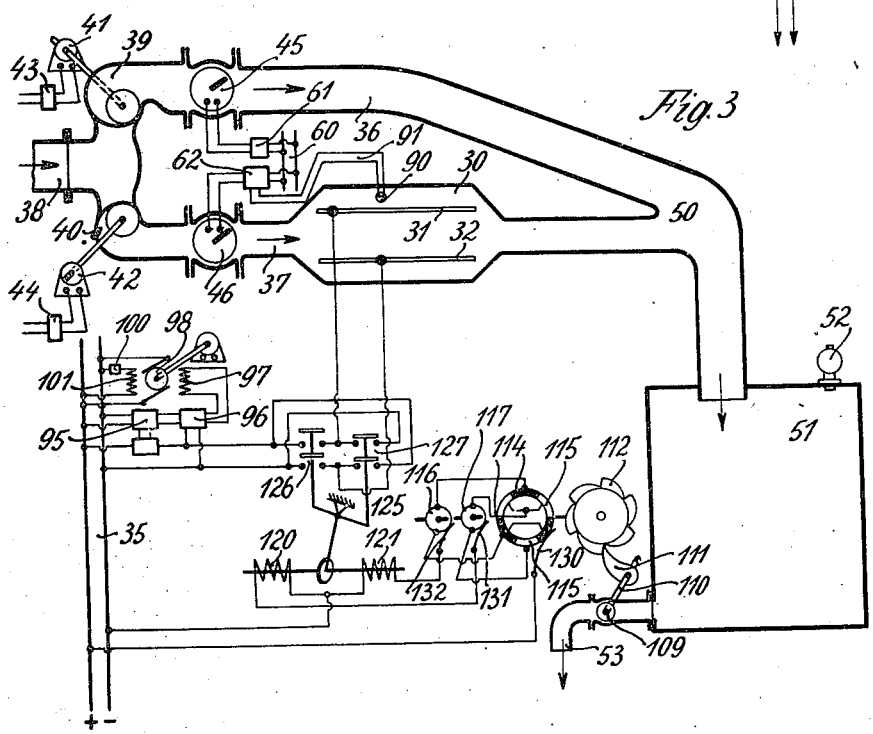
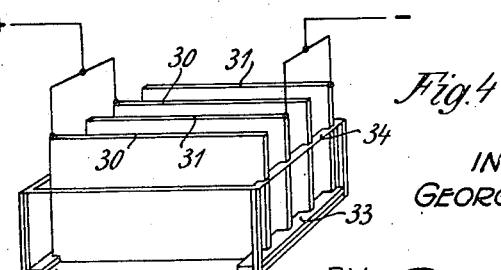
INVENTOR
GEORG A. KRAUSE
BY *Bean & Brooks*
ATTORNEYS July 7, 1936.  G. A. KRAUSE  2,046,467
STERILIZATION OF LIQUIDS BY MEANS OF OLIGODYNAMY
Filed Jan. 20, 1932   2 Sheets-Sheet 2

INVENTOR
GEORG A. KRAUSE
BY Bean & Brooks
ATTORNEYS

Patented July 7, 1936

2,046,467

UNITED STATES PATENT OFFICE 2,046,467

STERILIZATION OF LIQUIDS BY MEANS OF OLIGODYNAMY

Georg A. Krause, Munich, Germany, assignor to Katadyn, Inc., New York, N. Y., a corporation of Delaware Application January 20, 1932, Serial No. 587,808
In Germany January 29, 1931

28 Claims. (Cl. 204—24)

My invention relates to the sterilization of liquids by means of oligodynamy, in which the oligodynamically active metal is supplied to the liquid by means of an electric current from electrodes, one of which at least consists of oligodynamically active metal.

Liquids of any desired nature may be subjected to the sterilization treatment, such as waste waters, the water of swimming baths, vegetable extracts, sera, furthermore food and the like, such as milk, fruit juices, drinking water and others.

According to my invention means are provided which permit the quantity of the liquid treated or the conditions of the electric current, or both, to be adjusted or regulated during the operation of the process, and to bring selectively a definite prescribed quantity of metal into the oligodynamically active state. The control of the working conditions, more particularly the supply of the oligodynamic metal to the liquid to be treated, may have various objects. The adjustment and regulation may thus serve to set the time within which the oligodynamic action should take place, and to adapt it to the conditions prevailing in each individual case, for instance the varying quantity of the liquid to be treated. The adjustment and control of the conditions may also be used to operate with as big a yield as possible, furthermore to take into account the local, space or other conditions, for instance, those determined by the varying composition of the liquid, its number of germs and their nature or by the changing quantities of liquid, which are to be treated.

In this respect the new process differs favorably from those known oligodynamic processes, in which the quiescent or agitated liquid to be sterilized is rendered oligodynamically active by contact with the metal. In those processes the metal on coming in contact with the liquid passes into the liquid only very slowly in sufficient oligodynamically active quantity. In contrast herewith the quantity of the metal entering the liquid can in my improved process be adjusted and regulated as desired within wide limits according to the conditions prevailing in each individual case.

My improved process may also serve to carry through the oligodynamic treatment in such a manner that no other electrolytic effects are brought about, such as a decomposition of the liquid to be treated or transport of suspended particles.

The adjustment or control of the conditions of the electric current relatively to the quiescent or agitated liquid to be treated may also serve to prevent or retard or otherwise to adjust the formation of suspensions of metal salts. These suspensions occur then when the voltage at the terminals or the current density employed exceeds the decomposition voltage of the liquid to be treated or of the salts contained therein. It is thus possible either to operate with such low current densities that the formation of suspensions, precipitations or the like of salts soluble with difficulty or insoluble is prevented from the very beginning, or the current density may be chosen so low, that the quantity of metal passing into solution at the anode remains below the limit of solubility of the metal salts soluble with difficulty produced under certain circumstances. My process may also be carried through in such a manner that comparatively high current densities are at first used until such a number of metal ions has been formed in the liquid to be treated, which, for instance, enters into reaction with the substances contained in the liquid. If the salts then forming are soluble with difficulty they are at first deposited on the anode and may form suspensions in the liquid while the treatment proceeds. If now the current density is reduced the formation of fresh ions is diminished.

A solution of the metal salts, which have already been formed, is then brought about by the electrolyte, so that after the lapse of some time the current intensity can be increased again. This periodic mode of operation, whereby the formation of ions is alternately increased or reduced, leads to extraordinary favorable operating conditions, more particularly with those processes which will be disclosed as the description proceeds, as regards the electric and oligodynamic conditions as well as the yield of the oligodynamically effective metals passing into solution.

Figure 6:
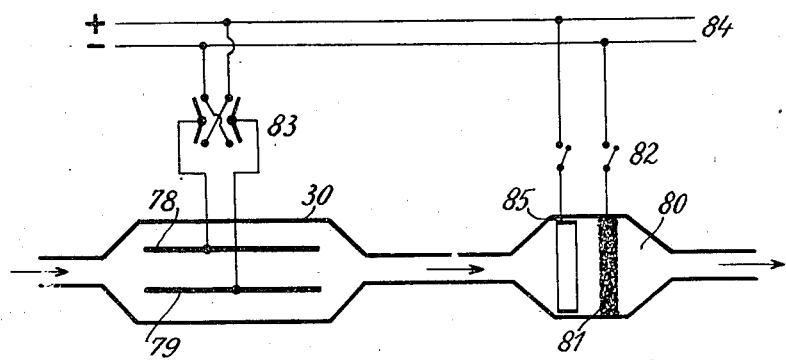

The invention further resides in the features of construction and the arrangements and combinations of parts of the apparatus employed for carrying through my improval process hereinafter described in detail and succinctly claimed, reference being had to the accompanying drawings, wherein are illustrated in;

Fig. 1, the arrangement of a treatment vessel, vat or tank, with vertically adjustable electrodes, in perspective view, Fig. 2, the arrangement of a treatment vessel with equipment for removing the deposits on the electrodes, in vertical section, Fig. 3, a diagram of a complete sterilization plant with automatic control, Fig. 4, a modification of the arrangement of the electrodes for a treatment vessel, in perspective view, Fig. 5, the diagrammatic representation of a flowthrough vessel for liquids to be treated, in horizontal section, and Fig. 6, a diagrammatic representation of a flowthrough vessel with a filter chamber located at the back of it, likewise in horizontal section.

Figure 7:
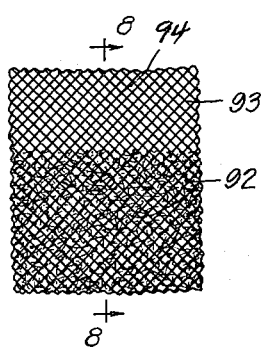
Figure 8:

Fig. 7, a diagrammatic representation of a permeable electrode or filter electrode in front view;

Fig. 8, a cross section of Fig. 7 along the line 8—8.

Referring to Fig. 1 of the drawings, an apparatus is shown which is adapted to permit the electrodes to be withdrawn from the process or to be inserted into it at any time, without the necessity of interrupting the continuity of the operations. A mechanism may thus, for instance, be provided which mechanically feeds the anode, into the liquid at the rate of its consumption. An equipment of this kind is diagrammatically shown in Fig. 1. In this figure the reference numeral 11 indicates a vessel tank, or vat containing a liquid 12 to be treated oligodynamically. 13 is the anode and 14 the cathode. The anode 13 is, for example, provided with a rack 16 meshing with a pininon 17 adapted to be driven by a suitable motor, for instance a clock mechanism 18, in such a way that the anode plate is fed or immersed into the liquid at the rate of its consumption.

The electric treatment to bring the oligodynamically active metal into solution may also be combined with a mechanical treatment. The efficacy of the process for the maintenance of favorable operating conditions may thus be further improved by brushing or polishing the electrodes, or by imparting to the liquid itself a vigorous whirling motion or by squirting it against the electrodes at an increased pressure, in order to prevent polarization or improverishment phenomena.

An embodiment of this feature of my invention is illustrated in Fig. 2 of the drawings. The liquid to be treated is here made to flow through the treatment vat 20. By means of a nozzle 21 it is squirted or sprayed against the anode or both electrodes 22, 23 and is discharged from the vat through the pipe 24. For mechanically cleaning the anode a brush 25 is provided, which is adapted to be quickly rotated by means of a suitable motor 26, for example a clock mechanism. For the same purpose the electrodes themselves may have a movement imparted to them, for instance by moving them up and down by means of a motor 18, gear wheel 17 and tooth rod 16 as shown in Fig. 1.

In certain circumstances it is sufficient to treat a portion of the liquid to be treated oligodynamically, and to mix this portion with the untreated portion of the liquid. The oligodynamic action which has been initiated in the treated portion then continues in the untreated portion. It is thus possible to control the degree of treatment by the ratio of the two part liquids, the duration of the treatment and the quantity of the metal which had been brought into solution in one portion of the liquid. The oligodynamically active metal will be supplied to the treated portion of the liquid in excess of that required to treat the liquid oligodynamically, so that by mixing it with the untreated portion in a predetermined ratio the desired correct concentration of oligodynamically active metals is obtained in the mixed solutions. The sterilization may also be initiated or started by means of an oligodynamically powerful metal, such as silver, and then be completed by means of a less effective metal, for instance, copper. The less active metal may likewise be generated in a partial current of the liquid and be then mixed with the main current.

With this arrangement the further advantage is obtained that on mixing the two part currents metal salt suspensions which may develop in the treated portion of the liquid in consequence of the fact that the current density in the treated portion and thus the terminal voltage exceeds the decomposition tension of the water or other liquid to be treated or the compounds contained therein can be dissolved.

The same effect may be attained if in the same current of liquid successively or periodically alternating suspensions, deposits or the like are formed by high current density, which then, on stopping or reducing the electric current, are again dissolved in the flowing liquid. The suspensions washed away from the electrodes may also be collected on an electrode or in a filter and be dissolved again by a weak or untreated liquid.

By my improved process it is thus possible to go with the current density in the portion of the liquid to be treated to that permissible limit at which the development of suspensions is just avoided or where they develop to such an extent only that they may be removed again by the admixture of the untreated portion so that the process may be carried through with the highest possible current load in a short time and without any breakdowns.

A particularly favorable arrangement for carrying out my improved process results if the treatment takes place in a flow-through vessel, because it is then possible to bring about a reduction of the germs or perfect sterilization in a shorter or longer time in large or small quantities of liquids according to the conditions in each individual case, by bringing the quantity of the liquid flowing through the vessel, the size of the electrodes, the current and the voltage in an appropriate relation to one another.

Conditions are particularly favorable if the liquid to be treated is passed through the vessel under pressure, because provided the electrical conditions are suitably proportioned and adjusted comparatively small treatment vessels and thus equipment of small bulk may then be employed for the treatment of the liquid, which according to their purpose may be stationary, movable, for instance, also portable or mounted on a truck.

Such a stationary or movable plant then consists of the treatment chamber with the electrodes, a storage tank, the pumps for circulating the liquid and the electric equipment, consisting of a suitable source of current and switchgear including the regulating or control mechanism.

In the flow-through vessel the electrodes will be so arranged that their faces are located in the direction of flow, so that a good distribution of the liquid will take place and the resistance to the flow will be a minimum. The electrodes may be located side by side or one above the other, and the flow of the liquid may be horizontal or vertical. It is, however, also possible to place the sides of the electrodes transversely to the flow of liquid, as shown correspondingly with electrodes 22 and 23, Fig. 2, so that the liquid flows around them, or through them in the case of permeable electrodes, which as diagrammatically shown in Figs. 7 and 8, when the electrodes 94 consist of separate pieces 92, such as rods, metal bodies, chips, scrapings, strips and so on, or of separate bodies or pieces coated with metal are filled into perforated or sieve-like bodies or containers 93 of conducting or non-conducting material, such as porcelain, which are immersed or suspended in the liquid, the contents of the baskets being then capable of being replenished at the rate of consumption without interrupting the treatment or process.

A preferred embodiment of my invention in which the treatment takes place in a part current of the liquid to which the remaining current or liquid is added at the rear of the treatment chamber is illustrated in Fig. 3 of the drawings. In the treatment chamber 30 there are located two or more electrodes 31, 32, to which electric current is fed through suitable switchgear from mains 35. The vertically disposed electrode plates located in the direction of flow of the liquid may, for example, be arranged in a frame or tray 33, Fig. 4, maintaining them in working position by means of grooved or notched boards 34. This frame will preferably be constructed of some dielectric material, such as an iron frame lined or covered with India rubber. The treatment chamber may likewise be constructed of sheet iron coated with rubber.

In the example illustrated in Fig. 3 the liquid to be treated is conveyed from the main pipe 38 into the branch pipes 36, 37 by means of the pumps 39, 40. The pipe 37 leads the liquid to be treated into the treatment chamber 30. Behind the treatment chamber at the point 50 the part currents combine again and reach the storage tank 51, which is in the customary manner equipped with safety devices, such as 52, an overflow, gages or the like, and from which the treated liquid may be withdrawn, as desired, by means of a tap 53.

The pumps may be driven by electric motors 41, 42, for instance, which are provided with control gear 43, 44 of any suitable kind, for varying the speed of the pump and thus to regulate their output. Valves or other control devices 45, 46 may be employed for adjusting the volumes of the liquids. These control devices 45, 46 may be electrically operated, for instance, from a supply system 60 through suitable regulating or control gear, or time switches 61, 62. The electrodes may be constructed of an oligodynamically active metal right through or be coated with such a metal.

A preferred way of carrying out my improved process results if according to another feature of my invention and with the object of shortening the duration of the treatment, the oligodynamically active metal is added to the liquid to be treated in considerable excess. The sterilizing action then starts quickly and energetically and is finished rapidly. The excess of oligodynamically active metal may be withdrawn again from the liquid. For withdrawing this excess or the metal itself which has already acted oligodynamically, even in such cases in which no excess of oligodynamically active metal has been used, the metal may be electrolytically deposited on conducting bodies, such as metals or carbon connected as cathode, for the purpose of removing or recovering the metal. Auxiliary cathodes may then be coordinated to the main cathodes, as shown by way of example in Fig. 5 of the drawings. Referring to this figure 72 are the anodes, 73 the cathodes, and 74 the auxiliary cathodes. The main cathodes and the auxiliary cathodes may consist of the same metal as the oligodynamically active metal, but they may also consist of an oligodynamically inert metal. In order to bring about intimate contact with the liquid, the cathode serving for the deposition is preferably constructed with a large surface in relation to its volume, for instance porous, filter-like and so on.

A removal of the metal is also possible by conducting the treated liquid over a metallic material or by introducing into the liquid such a material, which is less precious than the metal to be deposited. For depositing silver, for example, copper or aluminium may thus be employed.

If for depositing the more precious metal a less precious metal is used, which is likewise oligodynamically active, the further advantage is obtained, that the process may be initiated or even completed vigorously by a precious metal, and the less precious metal may be employed either to complete the process or to impart permanent bactericidal qualities to the liquid. If, for instance, copper is employed upon which silver is made to deposit, the electro-chemical equivalent quantity of copper passes into solution when the silver is deposited. The more precious metal is thus removed or recovered after it has done its duty, while for carrying on the treatment or for imparting bactericidal properties to the liquid the less precious metal then becomes operative. It is furthermore possible to remove the metal from the liquid by treating it with adsorbing or absorbing materials. The well known adsorbing or absorbing materials, such as coal, pumicestone, glass, asbestos, cellulose and many others may be used for this purpose. The adsorbing or absorbing material employed may also be regenerated and the metal taken up by it recovered. In the case of coal the metal may be allowed to enrich itself or to concentrate in the coal filters to such an extent that the recovery of the metal by reducing the coal to ashes becomes an economical proposition. In the case of filters of glass, asbestos and the like the metal may be dissolved by means of a strong acid, such as nitric acid, and thus the metal recovered and the filter regenerated.

The dissolved metal may also be removed by means of coagulating agents. If, for example, raw water is first sterilized by means of silver, it is during the subsequent action of aluminium sulphate and a base possible to remove the silver together with the deposited aluminium hydroxide completely or partly from the liquid.

Under certain circumstances it is also possible to remove the oligodynamically active metal by precipitation agents. Silver, for example, may thus be precipitated out of the water by forming silver sulphide and subsequent filtration.

Like the metals, microorganisms which have absorbed the metal may be separated from the liquid.

The metal which has served for the sterilization may be removed from the liquid in the treatment chamber or in additional chambers, with the liquid either in the quiescent or the flowing state.

Fig. 6 of the drawings shows an embodiment of my invention in which a filter chamber 80 is located in the rear of the treatment chamber 30 containing the electrodes 78, 79. As filtering means the above described materials in the form of pieces or lumps may serve. The filter 81 may, however, also consist of absorbing or adsorbing materials, such as coal, pumice-stone, glass, pieces of glass, asbestos, cellulose and many others. If it is desired to precipitate the silver electrolytically, a preferably small auxiliary anode 85 of large surface, for example in ring form, is placed into the chamber 80 adjacent to and in front of the filter 81 consisting of conducting material, and the filter itself is connected as cathode. In the leads are preferably connected switches 82 for switching the electric current on and off.

In certain cases it is of advantage to combine the hereinbefore described treatment of the liquid according to my invention with a heat treatment, which may take place before, during or after the electrical treatment.

In the example illustrated in Fig. 6 of the drawings, the electrodes 78, 79 are through a change-over switch 83 connected to the supply system 84, so that their polarity may be changed from time to time.

This changing of the polarity of the electrodes proves advantageous in various directions. If both electrodes consist of the same oligodynamically active metal the changing of the poles may serve to bring about a uniform consumption or wear of the electrodes. Moreover the changing of polarity presents great advantages as regards the carrying out of the process free from any disturbances and at a high efficiency coefficient, good utilization of the oligodynamically active metal and the electrical energy which brings the oligodynamically active metal into solution.

If it is assumed, for example, that the embodiment of my invention illustrated in Fig. 6 of the drawings represents a plant for sterilizing water by means of silver, silver passes into solution at the anode, for instance 79, under the action of the electric current when the change-over switch is thrown over to make contact at the top.

By the chlorides present in almost every water silver chloride is first formed of the silver dissolved as ion, and now forms a coating on the anode. As silver chloride is insoluble in water, more particularly in water containing salts, the separated silver chloride is dissolved again under formation of a complex salt, silver chloride-sodium chloride, one portion adhering to the anode, however. This coating increases the resistance between the electrodes, so that the current drops and the voltage rises.

If the switch 83 is now thrown over, so that the electrode 78 becomes the anode and the electrode 79 the cathode, the silver chloride present on the plate 79, the anode up to now, is reduced to metallic silver and thus acts as depolarizer, so that after reversing the polarity the current builds up again and the voltage drops. This reversal of the polarity may thus be effected by the aid of the indicating instruments of the electric system, but suitable switchgear may also be provided which operates in dependence of current or voltage or both, for effecting the reversal of the polarity automatically as soon as according to the conditions prevailing the coating increasing the resistance of the electrolyte has formed on the anode, the polarity of the electrodes being automatically reversed as soon as according to the existing regulating appliances or conditions the voltage or the current or both exceed predetermined limits.

My improved process may now be further developed by reversing the polarity again as soon as on the present anode a coating of salt of the oligodynamically active metal has formed again, and then reverses the polarity again after the salt has become reduced to metal, until the coating of the salt of the metal is formed again on the anode, and so on.

On the other hand it is also possible to control the coating on the anode by adjusting or reversing the relation of the electric current to the quantity of liquid to be treated so that the salt, which the metal detaching itself from the anode, is entirely or in the desired proportion dissolved in the liquid.

By the just described reversal of the polarity of the electrodes it is thus possible to carry out the treatment of the liquid with a maximum of current and voltage, i. e. in a very short time under electrically favorable conditions, determined by the fact that the coating liable to cause disturbances is permitted to form in a just bearable quantity and is then again removed.

Fig. 3 of the drawings shows, furthermore, diagrammatically means for effecting the regulation automatically in dependence of the service values, voltage increases or current decreases in the case of electrodes liable to become coated or the quantity of the salt dissolved in the electrolyte.

Referring to this figure, 90 is a suitable control equipment dependent on the state of solution or on the activating state of the liquid, which across the lines 91 acts on the regulating mechanism 62 of the throttling device 46 and thus brings about an increased inflow, for example, to the liquid to be treated, in the event that the quantity of the coating produced exceeds a prescribed limit.

Instead of acting on the regulating or control device 62 the equipment may also act on the regulating device 61 for the throttling device 45 of the untreated portion of the liquid either by itself or also simultaneously with the device 62, or on the pump motors 41, 42 or other suitable regulating devices.

Referring to Fig. 3 of the drawings 95, 96 illustrate regulating devices responsive to the current or the voltage respectively supplied to the electrodes 31, 32. These regulating devices control for instance, the field 97 of a generator 98 feeding the network 35 for supplying the electrodes 31, 32. If the voltage and the current or both vary in the treatment chamber, the voltage of the network feeding the electrodes will be thus controlled in accordance with the regulating devices provided, so that the desired ratio of adhering and dissolving salt desired at the time can be adjusted, or any other working conditions which may be desirable at the time.

In the same way a regulating device may effect the reversal of the polarity of the electrodes, which is dependent on the state or condition of the electrolyte as soon as a certain limit in the condition is exceeded, so that the regulation of the desired proportion of adhering or dissolving salt is effected by the reversal of the polarity.

If plants with uniform operation, with uniform or controllable conditions for definite periods are concerned, the regulation of the current conditions or the reversal of the polarity of the electrodes may be effected by time switches. The quantity of the liquid to be treated flowing through the apparatus may thus, for example, be temporarily stopped or reduced to a definite measure by means of the time switch 61, 62, Fig. 3, or the proportion between treated and untreated liquid be adjusted. It is, however, also possible to switch off the current temporarily and to switch it on again by means of a time switch 100, for instance, which may control a suitable field winding 101 of the generator 98, while the quantity of the liquid passing through remains constant, so that at times the liquid is activated vigorously, while the automatic after-sterilization takes place in the intervals when the current is switched off.

Such an intermittent or stepwise working is, however, also possible, if it is desired to prepare a stock of sterilized liquid in definite intervals, which stock is then consumed during other periods in which the time switch has cut off the supply of current.

The temporary shutting down or reduction of the quantity of liquid to be treated and flowing through the apparatus may also in suitable manner be combined with the current control gear.

If a plant is concerned in which a stock or reserve of sterile liquid is prepared, which is withdrawn at definite moments and in irregular quantity with intervals, as for instance in house drinking water storage tanks or plants or other similarly operating plants, which are used temporarily, the polarity reversing switch may according to another feature of my invention in suitable manner be combined with the tapping device of the tank, for instance, mechanically, by hydraulic transmission, by electric or electromagnetic means.

Fig. 3 of the drawings illustrates an embodiment of this feature of my invention. Referring to this figure it will be observed that with the manipulating lever 110 of the plug 109 of the tapping cock 53 of the tank 51 there is connected a pawl 111 which displaces a ratchet wheel 112 by one tooth at a time when the cock carries out a movement in a definite direction, an opening or closing movement. By the ratchet wheel 112 a commutator 113 is stepwise turned through an angle corresponding with the length of a segment 114 or 115 which through the slip-rings 116, 117 and brushes 130, 131, 132 control one of the magnet coils 120, 121 of the relay change-over switch 125 at a time, so that one of the pairs of contacts 126 or 127 is switched in at a time, and the polarity of the electrodes 31, 32 is reversed from the network 35 in one or the other direction.

The reversal of the polarity of the electrodes thus takes place every time when according to the direction in which the cock acts upon the ratchet wheel the cock is opened or closed, without any attendance being required. The time switch 100 may then serve to shut down the plant automatically during the regular stopping periods, for instance during the night.

Particularly favorable conditions for the reversal of the polarity result, if one of the electrodes consists of a material insoluble in the electrolyte employed, for example carbon, platinum, ferro-silicon, nonoxidable steel and the like. A particularly rational utilization of the metal used for the solution may be obtained thereby, and at the same time favorable electrical conditions, inasmuch the increasing of the voltage is limited.

The electrode of insoluble material will first be connected as cathode, then by reversing the polarity the salt of the oligodynamically active metal produced at the anode will be reduced without the metal as such passing at first into solution to an extent worth mentioning. The metal now reforms in spongy state on the electrode of oligodynamically active metal. This non-activated liquid is then mixed with already previously activated liquid, and the activation is continued by changing the polarity of the electrodes, and so forth.

The spongy metal which has settled on the electrode of oligodynamically active metal then first passes into solution, before further metal is dissolved out of this electrode.

The voltage to be supplied to the electrodes will be proportioned in accordance with the viewpoints stated above. Should the sterilization of water be concerned and a decomposition of the water be avoided, it will be kept below 1.6 volts, and even lower in the case of water of a high lime content. The intensity of the current on the other hand, will depend upon the quantity of the oligodynamically active metal which is to be passed into the liquid, and in the case of silver and water will lie between 15 and 200 $\gamma$ (where gamma is one one thousandth of a milligram, 0.001 Mg) or above per litre of the water to be treated.

Favorable conditions result if under appropriate voltage conditions depending upon the liquid to be treated, and also taking the suspensions or coatings forming into account, the contact period is suitably chosen, for instance so that in each litre of water 100 $\gamma$ silver are brought into solution within 5 to 10 seconds. Higher or lower values may be attained in correspondingly longer or shorter periods.

My researches have furthermore shown that considerable current yields (ratio of the dissolved quantity of metal to the electrochemical equivalent) may be reached if low current densities are used. Low current densities mean on the other hand an enlargement of the apparatus or extension of the duration of the process. Favorable economical conditions are attained if the anodic current yield amounts to at least 20 percent, and an optimum of conditions is reached if the anodic current yield lies between 20 and 60 percent. Higher current yields call for larger apparatus.

Various changes and modifications in my process and apparatus will suggest themselves to those skilled in the art, and I desire it to be distinctly understood that those are intended to be covered by my appended claims.

It will be understood that the term "precious metal" includes gold, silver and platinum while the term "non-precious metal" refers to metals other than gold, silver and platinum.

I claim as my invention:

1. In apparatus for sterilizing liquids by means of oligodynamy, in which the oligodynamically active metal is supplied to the liquid by means of the electric current from electrodes, of which at least the anode consists of oligodynamically active metal, means adapted to control the quantity of the liquid to be treated and the electric current conditions relatively to each other, for the purpose of bringing selectively a definite quantity of metal in the oligodynamically active state.

2. A process of sterilizing liquids by means of oligodynamy, in which the oligodynamically active metal is supplied to the liquid from electrodes, of which at least the anode consists of oligodynamically active metal, which consists in controlling the quantity of the liquid to be treated and the electric current conditions relatively to each other, for the purpose of bringing selectively a definite quantity of metal in the oligodynamically active state.

3. A process of sterilizing liquids by means of oligodynamy, in which the oligodynamically active metal is supplied to the liquid from electrodes, of which at least the anode consists of oligodynamically active metal, which consists in keeping the anodic and cathodic current density so low only, that the oligodynamically active metal is dissolved out of the anode without causing any further electrolytic actions (such as decomposition of the liquid to be treated, formation or transport of suspended particles).

4. In a process as set forth in claim 2, choosing the current density so low, that the formation of suspensions, deposits and so on of difficultly soluble or insoluble metal salts at the electrodes is prevented.

5. In apparatus as set forth in claim 1, means for moving at least one of the electrodes during operations.

6. In a process as set forth in claim 2, choosing the current density so that anode deposits of metal salts soluble with difficulty are formed on the anode, and removing said deposits by mechanical means.

7. A process for sterilizing liquids by means of oligodynamy, in which the oligodynamically active metal is supplied to the liquid from electrodes, of which at least the anode consists of oligodynamically active metal, which consists in extending the treatment of the liquid by means of the electric current to one portion of the liquid to be treated only, whereupon the treated portion is mixed with the remaining liquid.

8. A process for sterilizing liquids by means of oligodynamy, in which the oligodynamically active metal is supplied to the liquid from electrodes, of which at least the anode consists of oligodynamically active metal, which consists in extending the treatment of the liquid by means of the electric current to one portion of the liquid to be treated only, adjusting the current so that the quantity of the anode medium passing into solution exceeds the solubility of the metal salt produced therefrom thereby producing a precipitate of the salt of such metal, and thereafter diluting with untreated or weakly treated liquid whereby the precipitate of said salt is dissolved.

9. A process for sterilizing liquids by means of oligodynamy, in which the oligodynamically active metal is supplied to the liquid from electrodes, of which at least the anode consists of oligodynamically active metal, which consists in extending the treatment of the liquid by means of the electric current to one portion of the liquid to be treated only, suspensions, deposits, and so on being alternately formed in successive intervals by high current intensities, the deposits being again dissolved in the flowing liquid after discontinuing or reducing the electric current.

10. A process for sterilizing liquids by means of oligodynamy, in which the oligodynamically active meal is supplied to the liquid from electrodes, of which at least the anode consists of oligodynamically active metal, which consists in extending the treatment of the liquid by means of the electric current to one portion of the liquid to be treated only, the suspensions produced being washed off the electrodes and collected in a filter, being subsequently dissolved by weak or untreated liquid flowing through said filter.

11. A process for sterilizing liquids by means of oligodynamy, in which the oligodynamically active metal is supplied to the liquid from electrodes, of which at least the anode consists of oligodynamically active metal, which consists in initiating the sterilization process by an oligodynamically powerfully acting metal and completing it by an oligodynamically weaker acting metal.

12. A process for sterilizing liquids by means of oligodynamy, in which the oligodynamically active metal is supplied to the liquid from electrodes, of which at least the anode consists of oligodynamically active metal, which consists in initiating the sterilization process by an oligodynamically powerfully acting metal and completing it by an oligodynamically weaker acting metal, the treatments with the oligodynamically powerfully and the oligodynamically weaker active metal being carried through in partial currents of the liquid, which are mixed together after the treatment has taken place.

13. The step in the process of sterilizing liquids by means of oligodynamy, in which the oligodynamically active metal is supplied to the liquid from electrodes, of which at least the anode consists of oligodynamically active metal, which consists in supplying an excess of oligodynamically active metal to a portion of the liquid to be treated above that required to treat such portion.

14. In apparatus for sterilizing liquids by means of oligodynamy, in which the oligodynamically active metal is supplied to the liquid by means of the electric current from electrodes, of which at least the anode consists of oligodynamically active metal, means for removing electrolytically the metal previously supplied to the liquid.

15. In apparatus for sterilizing liquids by means of oligodynamy, in which the oligodynamically active metal is supplied to the liquid by means of the electric current from electrodes, of which at least the anode consists of oligodynamically active metal, an auxiliary cathode for removing electrolytically the metal previously supplied to the liquid.

16. In apparatus for sterilizing liquids by means of oligodynamy in which the oligodynamically active metal is supplied to the liquid by means of the electric current from electrodes, of which at least the anode consists of oligodynamically active metal, and wherein at least the cathode consists of a filling of small metal pieces, and a permeable container for the reception of said metal pieces.

17. In apparatus for sterilizing liquids by means of oligodynamy, in which the oligodynamically active metal is supplied to the liquid by means of the electric current from electrodes, of which at least the anode consists of oligodynamically active metal, at least one electrode designed as a filter adapted to remove from the liquid the metal constituents contained therein and means for causing flow of said liquid through the filter.

18. In apparatus for sterilizing liquids by means of oligodynamy in which the oligodynamically active metal is supplied to the liquid by means of the electric current from electrodes, of which at least the anode consists of oligodynamically active metal, a switchgear adapted to reverse automatically the polarity of the electrodes as soon as the electric current values exceed predetermined conditions.

19. In an apparatus for the periodic withdrawal of liquids which have been sterilized by means of oligodynamy and in which the oligodynamically active metal is supplied to the liquid by means of the electric current from electrodes, of which at least the anode consists of oligodynamically active metal, switchgear for automatically reversing the polarity of the electrodes, as soon as the electric current values exceed predetermined conditions, a tapping device for the liquid, and means for operatively connecting said polarity reversing switch with said tapping device.

20. A process for sterilizing liquids by means of oligodynamy in which the oligodynamically active metal is supplied to the liquid by means of the electric current from electrodes of which at least the anode is constructed of oligodynamically active metal, which consists in alternately reversing the polarity of the electrodes as soon as a coating of the salt of the oligodynamically active metal has formed on the anode, again reversing the polarity of the electrodes after the salt has been reduced to metal, until the coating of the salt of the metal forms again on the anode, and so on.

21. In apparatus for sterilizing liquids by means of oligodynamy in which the oligodynamically active metal is supplied to the liquid by means of the electric current from electrodes, of which at least the anode consists of oligodynamically active metal, means for reversing the polarity of the electrodes as soon as a coating of the salt of the oligodynamically active metal has been produced on the anode, means for again reversing the polarity of the electrodes after the salt has been reduced to the metal until a coating of the salt of the metal forms upon the anode, and so on, one electrode consisting of a material insoluble in the liquid to be treated.

22. In a process for the oligodynamic treatment of liquids, in which the oligodynamically active metal is supplied to the liquid by means of the electric current from electrodes, of which at least the anode consists of oligodynamically active metal, adjusting the proportion of the electric current to the quantity of the liquid to be treated in such a way that the salt which is formed from the metal detaching itself from the anode is constantly dissolved in the liquid to a predetermined extent.

23. In a process for the oligodynamic treatment of liquids, in which the oligodynamically active metal is supplied to the liquid by means of the electric current from electrodes, of which at least the anode consists of oligodynamically active metal, adjusting the proportion of the electric current to the quantity of the liquid to be treated in such a way that the salt which is formed from the metal detaching itself from the anode is constantly dissolved in the liquid to a predetermined extent, and reversing the polarity of the electrodes for the purpose of controlling the desired proportion between the adhering and the dissolving salt.

24. In apparatus for the oligodynamic treatment of liquids in which the oligodynamically active metal is supplied to the liquid by means of the electric current from electrodes of which at least the anode consists of oligodynamically active metal, an automatic timing gear adapted to reverse periodically the direction of passage of the electric current through the electrode and the flow of the liquid.

25. A process of oligodynamically treating liquids which comprises providing electrodes in said liquid, one of said electrodes being of an oligodynamically active metal and another of said electrodes being of a material insoluble in the liquid to be treated, passing current through said electrodes and liquid with said insoluble material as cathode and said oligodynamically active material as anode until an insoluble salt of said metal forms upon one of the electrodes, reducing said salt to metal, said metal reforming in a spongy condition on the electrode, mixing the liquid with liquid previously oligodynamically treated, and reversing the polarity of the electrodes.

26. The process of sterilizing liquids by means of oligodynamy in which the oligodynamically active metal is supplied to the liquid by means of the electric current from electrodes of which at least the anode consists of oligodynamically active metal, which comprises initiating the oligodynamic treatment by means of a precious metal and finishing the treatment with a non-precious metal, said non-precious metal being suitable for receiving electrolytic depositions of the precious metal and for imparting bactericidal qualities to the liquid undergoing treatment.

27. A process for oligodynamically treating liquids which comprises providing electrodes in said liquid, one of said electrodes being of an oligodynamically active metal and another of said electrodes being of a material insoluble in the liquid to be treated, passing current through said electrodes and liquid with said insoluble material as cathode and said oligodynamically active material as anode until an insoluble salt of said metal forms upon one of the electrodes, reversing the polarity of the electrodes whereby said salt is reduced to metal, the metal reforming in a spongy condition on the electrode, mixing the liquid with liquid previously oligodynamically treated, and reversing the polarity of the electrodes.

28. In apparatus for sterilizing liquids by means of oligodynamy in which the oligodynamically active metal is supplied to the liquid by means of the electric current, electrodes from which the oligodynamically active metal is supplied to the liquid, at least the anode consisting of oligodynamically active metal, filtering means positioned in the stream of treated liquid behind the electrodes in the direction of flow of the liquid, said filtering means being adapted to remove from the liquid the metal constituents added thereto.

GEORG A. KRAUSE.